US005117336A

United States Patent [19]

Scenzi

[11] Patent Number: 5,117,336

[45] Date of Patent: May 26, 1992

[54] WORKING SPOTLIGHT, PARTICULARLY FOR MOTOR VEHICLES

[75] Inventor: Bela Scenzi, Vienna, Austria

[73] Assignee: Hella KG Hueck & Co., Fed. Rep. of Germany

[21] Appl. No.: 707,219

[22] Filed: May 24, 1991

Related U.S. Application Data

[63] Continuation of Ser. No. 581,704, Sep. 13, 1990, abandoned.

[30] Foreign Application Priority Data

Sep. 14, 1989 [DE] Fed. Rep. of Germany ....... 3930746

[51] Int. Cl.5 ............ B60Q 1/00

[52] U.S. Cl. ............ 362/61; 362/83.1; 362/242; 362/247; 362/346

[58] Field of Search ............ 362/61, 80, 247, 346, 362/242, 243, 83.1, 83.3

[56] References Cited

U.S. PATENT DOCUMENTS

| | | | |
|---|---|---|---|
| 1,394,319 | 10/1921 | McNeal . | |
| 1,559,930 | 11/1925 | Bean . | |
| 1,702,746 | 2/1929 | Prichard . | |
| 4,498,124 | 2/1985 | Mayer et al. | 362/61 |
| 4,513,357 | 4/1985 | Nieda et al. | 362/80 |
| 4,539,627 | 9/1985 | Ogishima | 362/61 |
| 4,612,608 | 9/1986 | Pietz | 362/346 |
| 4,654,759 | 3/1987 | Fratty | 362/61 |
| 4,722,033 | 1/1988 | Van Duyn et al. | 362/80 |
| 4,731,713 | 3/1988 | Perthus | 362/61 |
| 4,827,367 | 5/1989 | Luciani | 362/80 |
| 4,895,693 | 1/1990 | Suzuki et al. | 362/247 |
| 4,985,814 | 1/1991 | Lyons | 362/346 |

FOREIGN PATENT DOCUMENTS

| | | |
|---|---|---|
| 722805 | 11/1931 | Fed. Rep. of Germany . |
| 2205610 | 8/1973 | Fed. Rep. of Germany . |
| 2205611 | 8/1973 | Fed. Rep. of Germany . |

*Primary Examiner*—Ira S. Lazarus
*Assistant Examiner*—Sue Hagarman
*Attorney, Agent, or Firm*—Griffin, Branigan & Butler

[57] ABSTRACT

A working spotlight for illuminating a wide area, particularly for motor-vehicles, of a type with a light source arranged at a focal point of a first reflector wherein the first reflector has an approximately parabolic cross section (5) below an optical axis and a substantially non-corrective lens (16) covering the reflector to produce an uncomplicated and inexpensive spotlight which can have a relatively small volume but an efficient wide-area illumination output. The light source has a transverse linear filament (3) which extends horizontally and perpendicular to the optical axis while a horizontal cross section of the reflector through the optical axis forms a first approximately elliptical portion (4). First and second such reflectors are mounted together with vertical cross sections of the reflectors through the optical axes, above the optical axes forming a second approximately elliptical portion (6) in the first reflector with a spacing between focal points larger than that between focal points of the first approximately elliptical portion of the first reflector and a parabolic portion (12) in the second reflector. A third approximately elliptical portion (10) of the second reflector in horizontal cross section having a greater spacing between focal points than the first approximately elliptical portion (4) of the first reflector.

8 Claims, 8 Drawing Sheets

WORKING SPOTLIGHT, PARTICULARLY FOR MOTOR VEHICLES

This application is a continuation application of application Ser. No. 07/581,704 filed Sept. 13, 1990, now abandoned.

BACKGROUND OF THE INVENTION

This invention relates to a working spotlight, particularly for use with motor vehicles.

It is possible to use such spotlights, particularly on motor vehicles, as working spotlights for illuminating work areas, when motor vehicles are stopped, or, when they are driven slowly, for illuminating sides of public streets.

A purpose of the invention is to provide a spotlight having a small size which provides uniform illumination of a large work area with a high light intensity without bothersome light intensity jumps between far and near areas which is uncomplicated and inexpensive and which has no correcting lens.

SUMMARY

According to principles of this invention, two reflectors are provided with a light source arranged at each of their respective focal points, the two reflectors being mounted together in a single housing which is covered by a common, substantially non-correcting, light shield. The first reflector has a first approximately elliptical portion at a horizontal cross section thereof through an optical axis thereof and a second approximately elliptical portion at a vertical cross section through the optical axis above the optical axis thereof, whereby a spacing between focal points of the second approximately elliptical portion is greater than a spacing of the focal points of the first approximately elliptical portion. The first reflector has a first approximately parabolic portion below the optical axis taken on a vertical cross section through the optical axis. The second reflector has a third approximately elliptical portion in a horizontal cross section through an optical axis, and an approximately parabolic portion at a vertical cross section through its optical axis, whereby a spacing between focal points of the third approximately elliptical portion of the second reflector is greater than a spacing of focal points of the first approximately elliptical portion of the first reflector. The optical axes of the reflectors are approximately parallel.

BRIEF DESCRIPTION OF THE DRAWINGS

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF A PREFERRED EMBODIMENT

Figure 1:
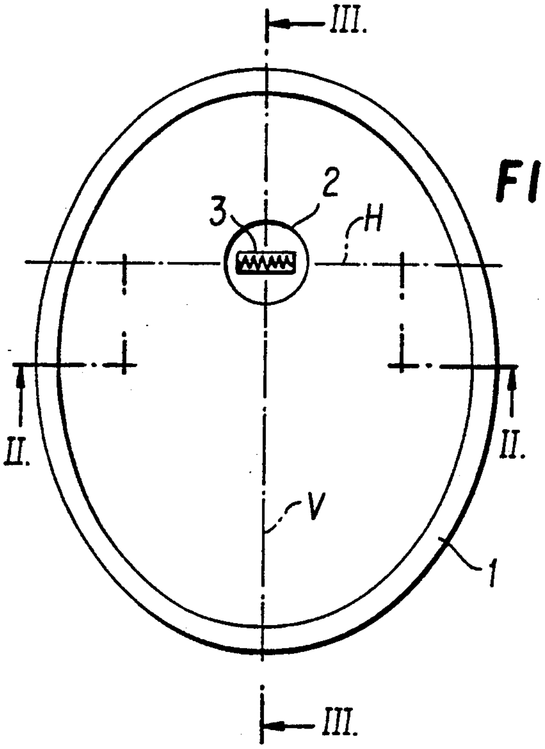
FIG. 1 is a front view of a first reflector of a spotlight of this invention taken along an optical axis thereof looking into the first reflector.

FIG. 1 depicts a first reflector 1 having a first receiving opening 2 therein for receiving a light source whose first glow filament 3 is depicted as being an elongated, transverse filament. The first glow filament 3 is arranged approximately in an optical axis of the first reflector 1, the optical axis being represented by an intersection line of a horizontal plane H through the optical axis and a vertical plane V through the optical axis. The first glow filament 3 extends along the horizontal plane H, perpendicular to the optical axis.

Figure 2:
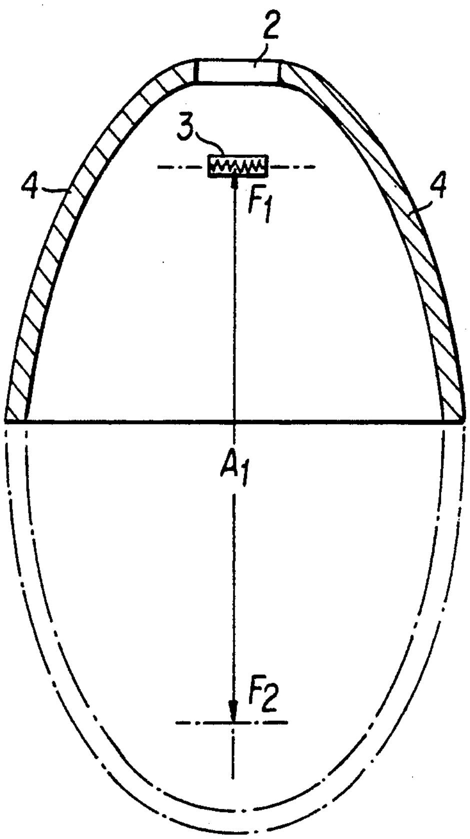
FIG. 2 is a horizontal cross section taken at II—II on the optical axis of the first reflector of FIG. 1 with a fictional continuation projection of elliptical portions 4 being shown in phantom.

A cross section through the first reflector of FIG. 1 is taken on the horizontal plane H through the optical axis in FIG. 2. Two first approximately elliptical portions 4, with small spaces $A_1$ between their focal points $F_1$ and $F_2$, can be seen near the first glow filament, on opposite sides thereof.

Figure 3:
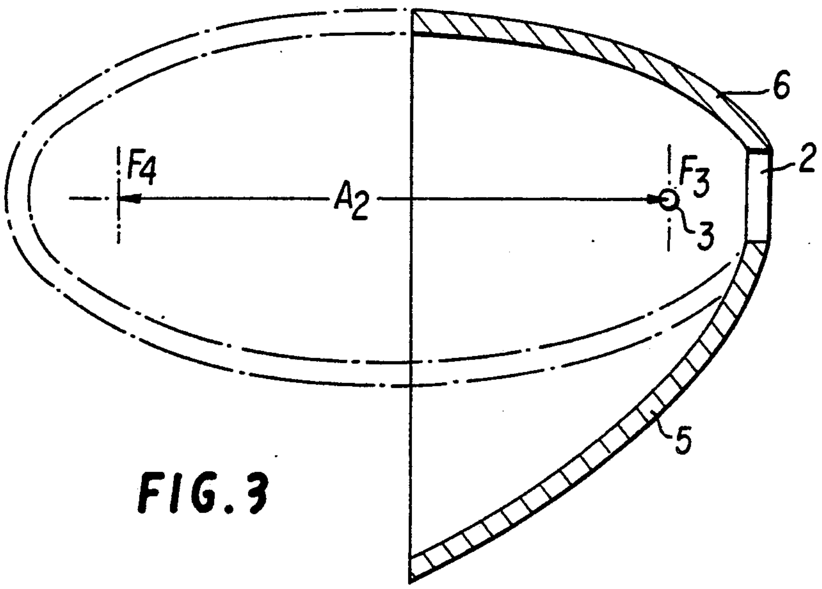
FIG. 3 is a vertical cross section taken at III—III on the optical axis of the reflector of FIG. 1 with a fictional continuation projection of an elliptical portion 6 being shown in phantom.

A vertical cross section through the optical axis of the reflector 1 according to FIG. 1 is represented in FIG. 3. A first approximately parabolic portion 5 can be seen below the horizontal plane H, including the optical axis, near the first glow filament and a second approximately elliptical portion 6 can be seen above the horizontal plane H as well as the optical axis having focal points $F_3$ and $F_4$ separated by a space $A_2$.

It is apparent in FIGS. 1 through 3 that the first reflector has a smaller width than height and that the light source lies quite removed from a center of surface gravity of the first reflector.

Figure 4:
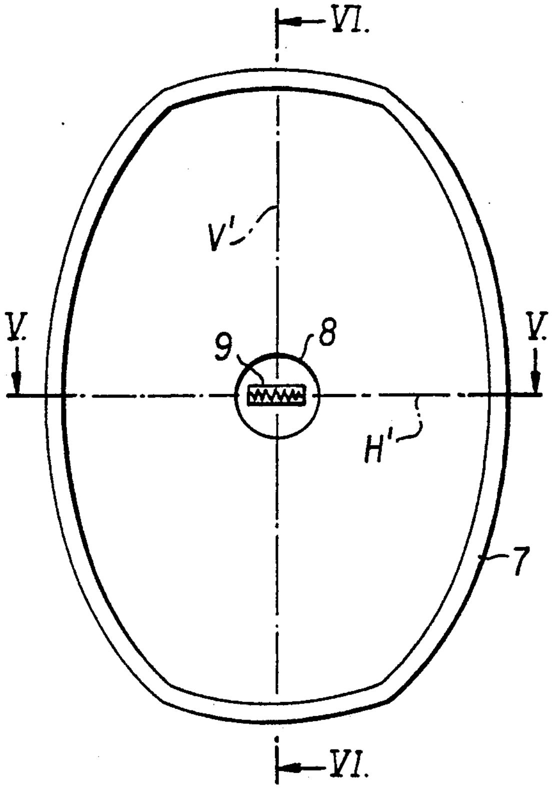
FIG. 4 is a front view of a second reflector of a working spotlight of this invention taken along an optical axis thereof looking into the second reflector.

A second reflector 7 is represented in FIG. 4 having a second receiving opening 8 for a second light source whose second glow filament 9 is depicted as being linear, or transverse, extending in a horizontal plane H' and being perpendicular to an optical axis of the second reflector. Further, a vertical plane V' is depicted in FIG. 4 passing through the optical axis.

Figure 5:
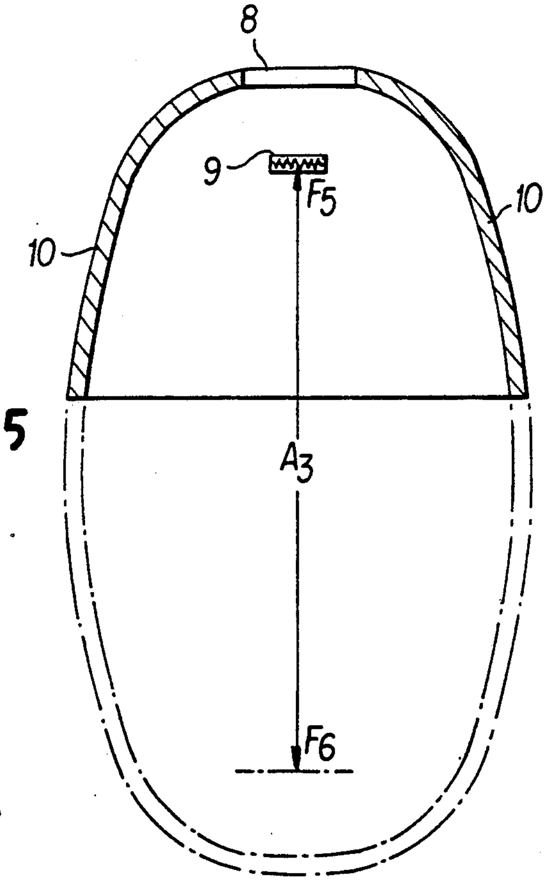
FIG. 5 is a horizontal cross section taken at V—V on the optical axis of the second reflector of FIG. 4 with a fictional continuation projection of elliptical portions 10 being shown in phantom.

A horizontal cross section taken through the optical axis of the second reflector of FIG. 4 is represented in FIG. 5. One should note the position of the second glow filament 9 relative to the vertical plane V' and a third approximately elliptical portion 10 which characterizes the shape of the second reflector 7. Focal points $F_5$ and $F_6$ of the third approximately elliptical portion 10 have a relatively large spacing $A_3$ therebetween.

Figure 6:
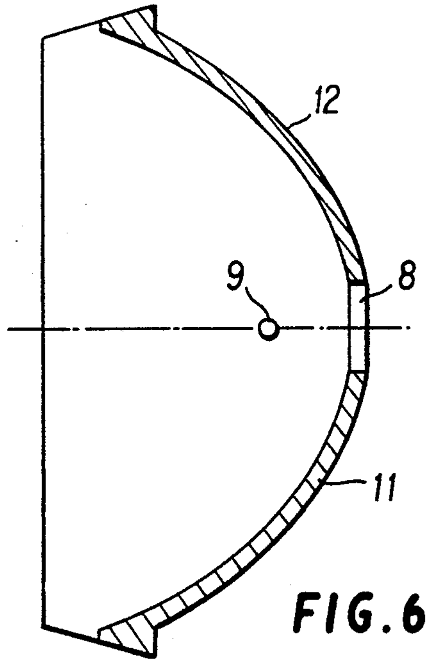
FIG. 6 is a vertical cross section taken at VI—VI on the optical axis of the second reflector of FIG. 4.

A vertical cross section through the optical axis of the second reflector 7 of FIG. 4 is shown in FIG. 6. The position of the second glow filament 9 relative to the horizontal plane H' through the horizontal axis is recognizable here as well. The second reflector 7 of FIG. 4, has a second approximately parabolic portion 11 shown in this cross section and a third approximate parabolic portion 12. The approximate parabolic portions 11 and 12 are preferably the same to guarantee a symmetry of light reflected from the reflector 7 relative to the horizontal plane H. However, depending on how the second reflector 7 is to be used, it is also possible to use approximate parabolic portions 11 and 12 which are different from one another.

Figure 7:
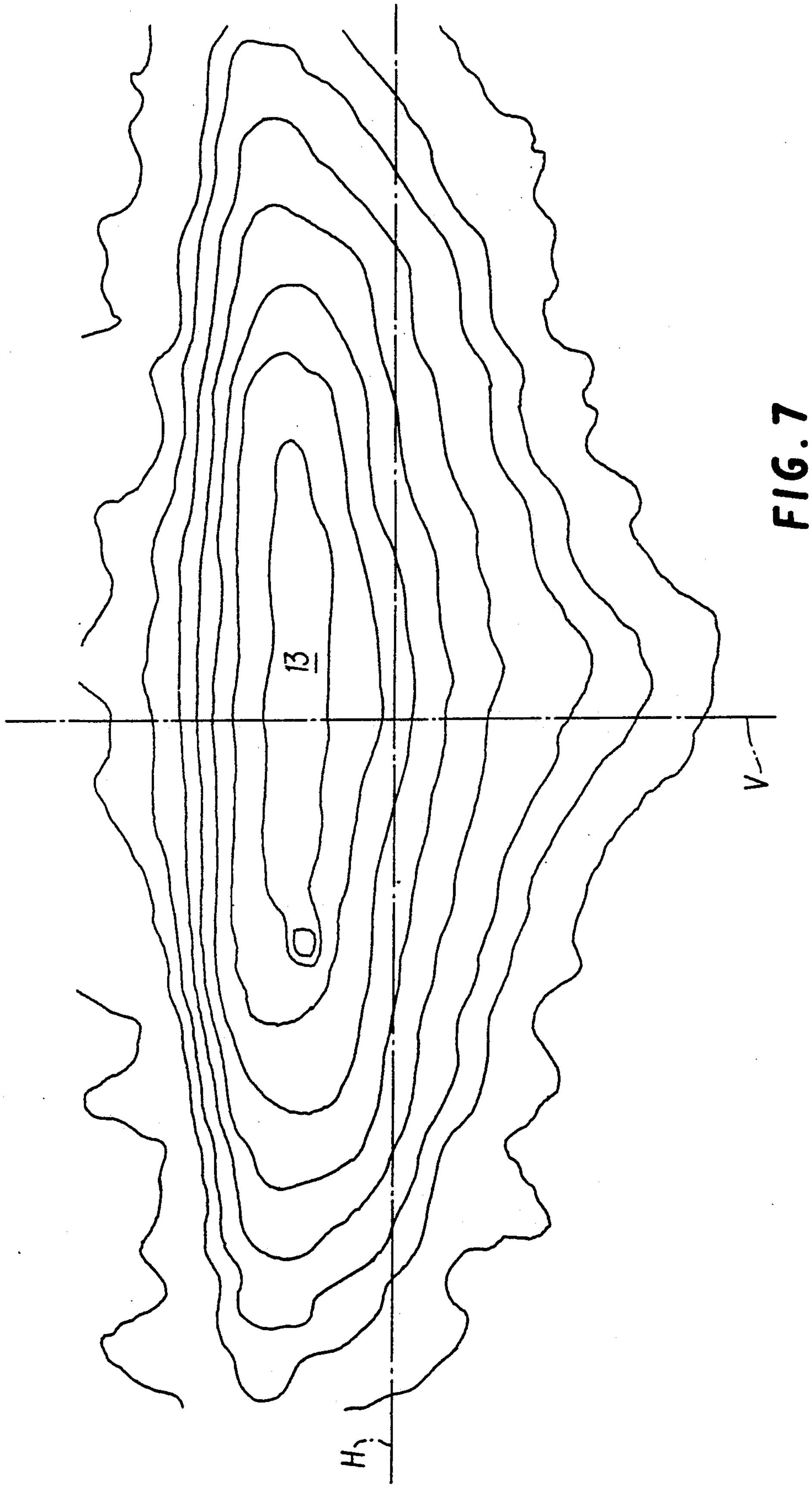
FIG. 7 is a diagram of lines of like light intensity from the first reflector of FIG. 1.
Figure 8:
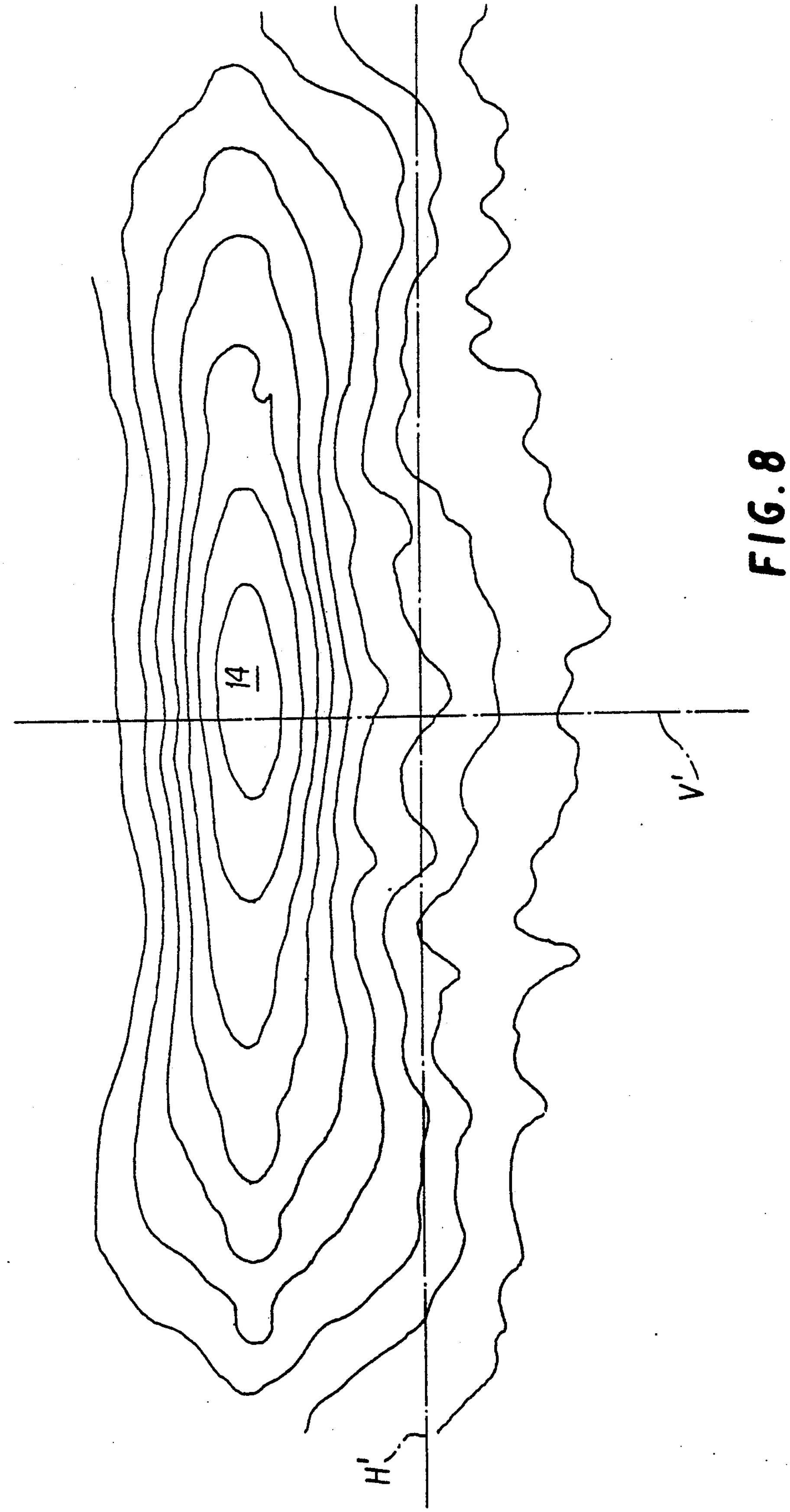
FIG. 8 is a diagram of lines of like light intensity from the second reflector of FIG. 4.

A light intensity of light from the first reflector 1 on a screen positioned 25 meters in front of the first reflector 1 is represented by lines of like, or equal, light intensity in FIG. 7. The horizontal plane H and the vertical plane V are also shown here passing through the optical axis in order to show the position of a field 13 of highest light intensity relative to the optical axis. One can recognize a wide illumination pattern along the horizontal plane H, a logarithmic increase of light intensity to field 13 of highest light intensity from down to up in FIG. 7, and a similar rapid reduction of light intensity above the field 13 in FIG. 7. FIG. 8 is a diagram with fields of like light intensity produced by the second reflector 7 according to FIG. 4 on a screen positioned 25 meters therefrom. The horizontal plane H' through the optical axis and the vertical plane V' through the optical axis are also represented here in order to show the position of a field 14 of highest light intensity on the 25 meter screen relative to the optical axis. One can see in FIG. 8 that a spreading of the field 14 of highest light intensity, produced by the second reflector 7, in both horizontal and vertical directions, is relatively small so as to produce a typical light intensity diagram of a distance spotlight or high beam.

Figure 9:
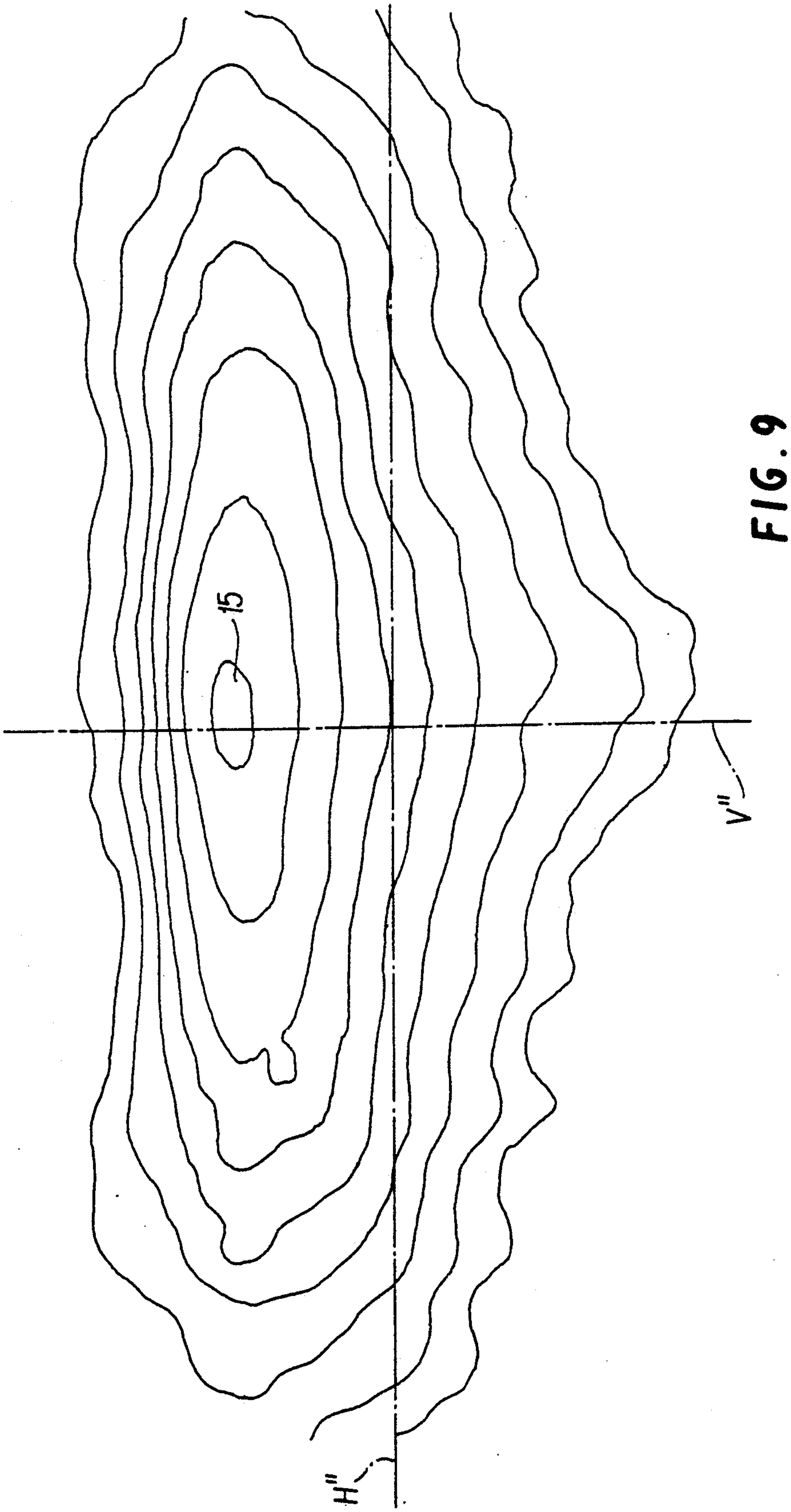
FIG. 9 is a diagram of lines of like light intensity produced by simultaneous operation of the first and second reflectors of FIGS. 1 and 4.

A diagram of FIG. 9 is of fields of like light intensity produced by simultaneous operation of a spotlight with a first reflector 1 and second reflector 7. A horizontal plane H'' and a vertical plane V'' are also shown here through a composite optical axis in order that a field 15 of highest light intensity on a 25 meter screen can be shown for simultaneous operation of reflectors 1 and 7. The light strength or intensity of filament images from the first and second reflectors 1 and 7 add together on the 25 meter screen to produce FIG. 9. If the light intensity in the diagram of FIG. 1 for field 13 is around 9 Lux and in the diagram of FIG. 8 for field 14 is around 16 Lux, the total light intensity of a field 15 in FIG. 9 is around 25 Lux.

One can recognize in FIG. 9 that a contour or shape of field 15 of highest light intensity is substantially determined by the second reflector 7 which is formed as a distance light reflector. However, it is also recognizable in FIG. 9 that there is uniform illumination in a forward field area between field 15 of highest light intensity and, for example, the horizontal plane H', and for this reason the field border lines of like light intensity are spaced approximately the same.

Figure 10:
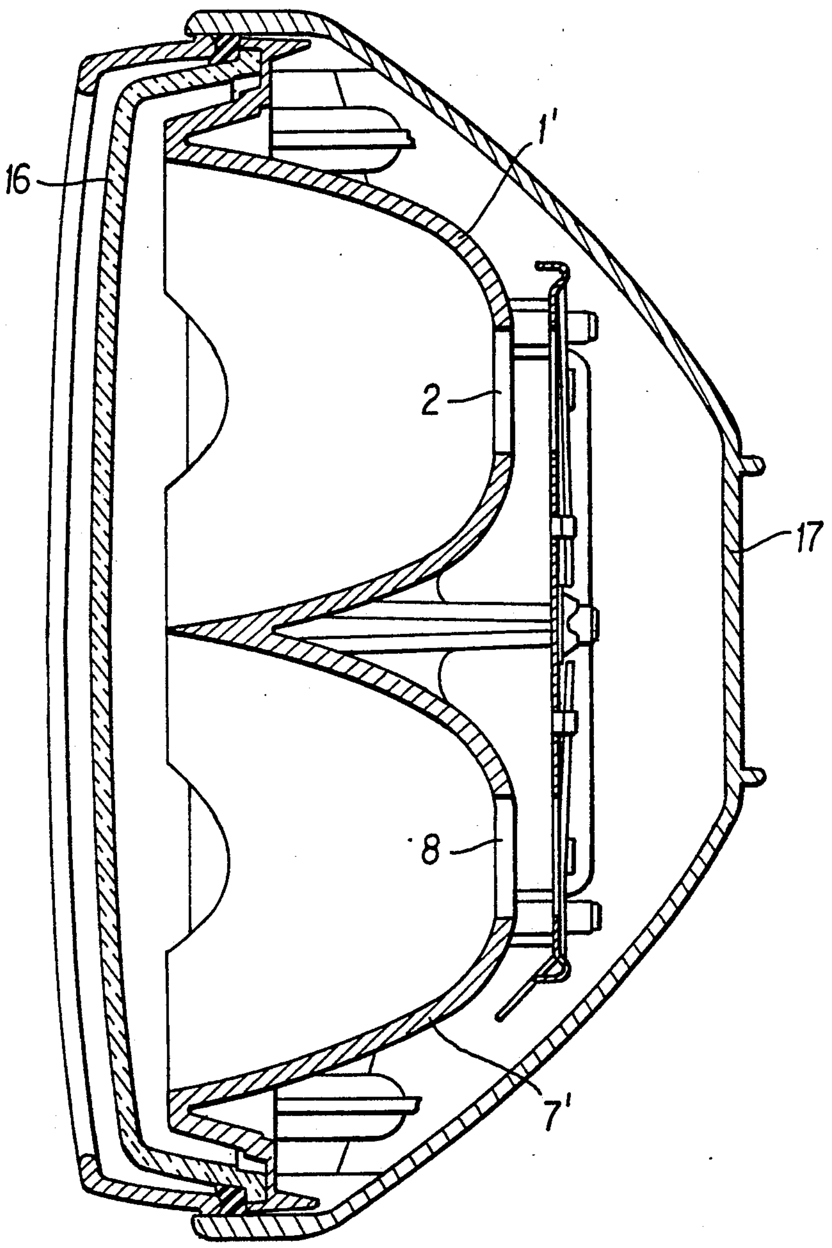
FIG. 10 is a horizontal cross-sectional view of a working spotlight of this invention including a composite double reflector comprising a reflector according to FIG. 1 and a reflector according to FIG. 4 arranged together.

A spotlight housing 17 that is covered by a transparent light shield 16 for a working spotlight is shown in FIG. 10. Within the spotlight housing 17 is a composite double reflector which is formed from a first reflector 1' and a second reflector 7' corresponding to first and second reflectors 1 and 7 of FIGS. 1 and 4. Further, in the cross section through the working spotlight of FIG. 10 one can see the first receiving opening 2 of a first light source and the second receiving opening 8 of a second light source. The reflector parts 1 and 7 can be constructed to such a composite double reflector of resinous plastic so that the optical axes of the first reflector 1' and the second reflector 7 are arranged approximately parallel to one another. With such a parallel arrangement of optical axes, the diagram of fields of like light density represented in FIG. 9 is produced. A working spotlight with a composite double reflector of FIG. 10 has the advantage that it can be uncomplicatedly and inexpensively constructed since few parts are necessary for its production.

Figure 11:
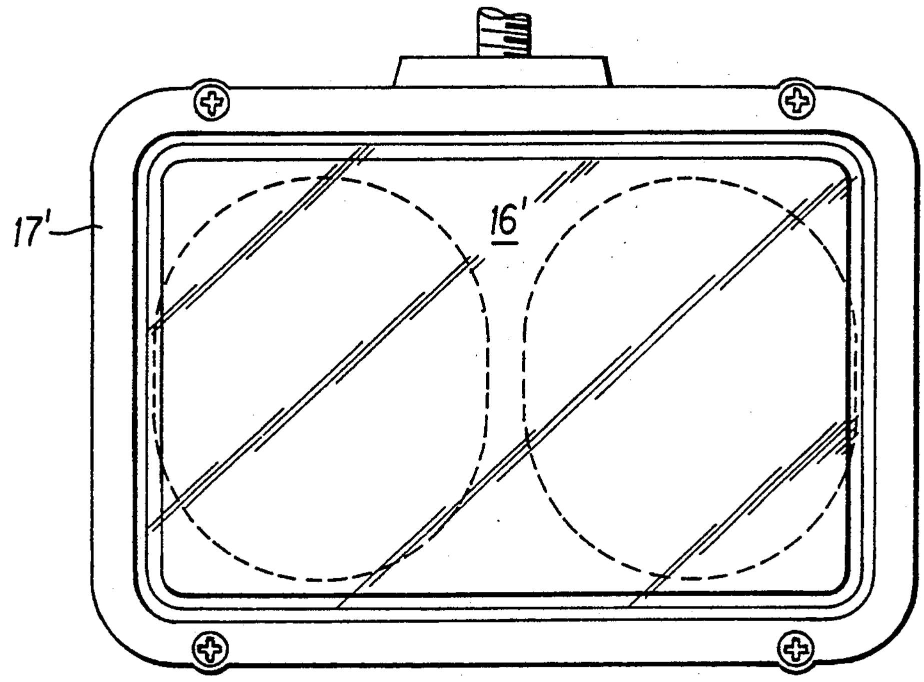
FIG. 11 is a front view of a working spotlight of this invention having reflectors according to FIGS. 1 and 4 which are formed separately from one another and which can be pivoted separately in a housing in which they are mounted.
Figure 12:
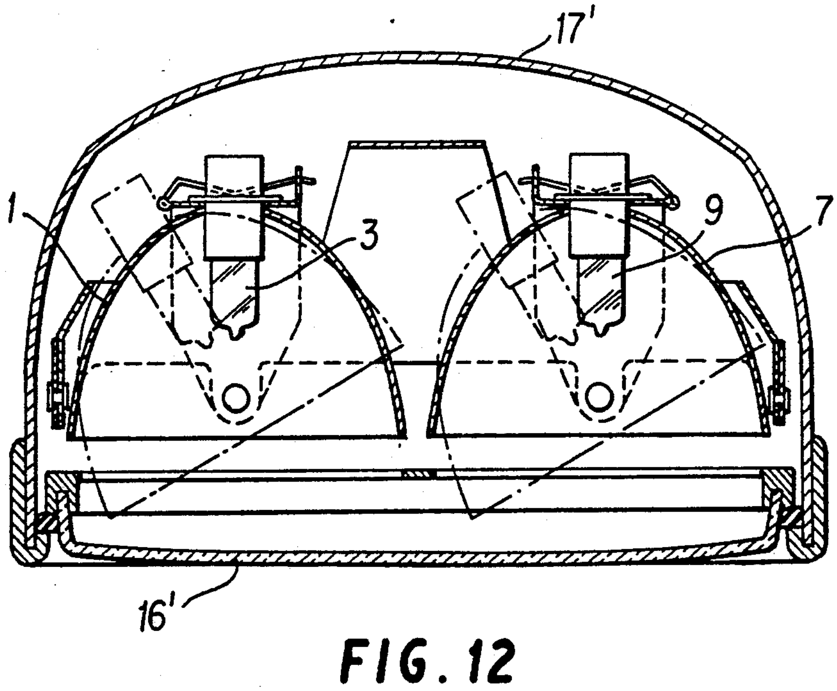
FIG. 12 is a horizontal cross-sectional view through the working spotlight of FIG. 11.
Figure 13:
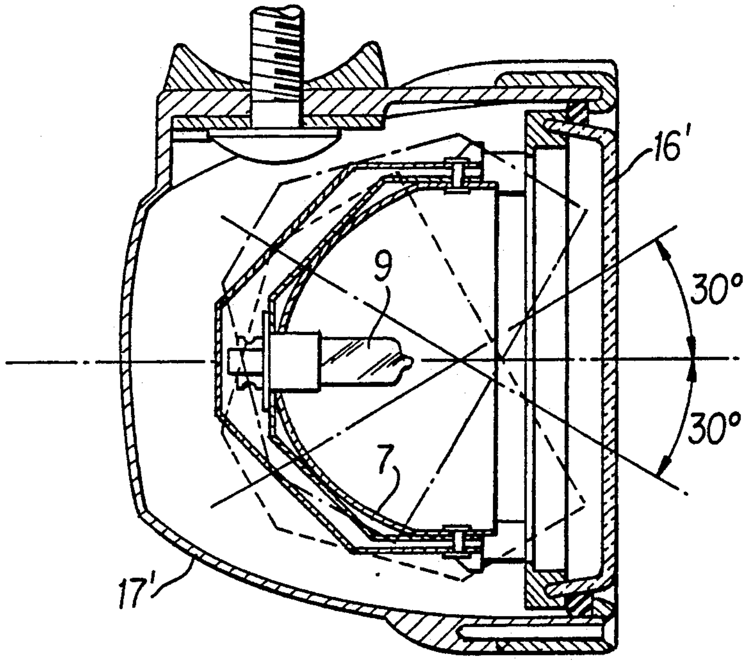
FIG. 13 is a partially schematic, vertical crosssectional view through one of the reflectors of the working spotlight of FIG. 11.

A spotlight is shown in FIGS. 11–13 in which the first reflector 1 and second reflector 7 can be pivoted or rotated, independently of one another in a working spotlight housing 17'. Also this spotlight housing 17' is covered by a substantially non-correcting light lens or light shield 16'. The position of the first glow filament 3 can also be recognized in FIGS. 12 and 13. It is also recognizable in FIGS. 12 and 13 that the reflectors 1 and 7 are hung on gimbles in two planes so that rotation, or pivoting, of the reflectors 1 and 7 about two axes relative to the spotlight housing 17' independently of one another is possible. In this manner, the first reflector 1 as well as the second reflector 7 can be used to individually illuminate separate, or overlapping, work areas.

Through the choice of an ellipse with a small spacing of focal points the first reflector can produce a desired large width illuminated area in a horizontal axis without the use of a correcting light shield or lens. In this regard, reflected light beams from the elliptical surface cross one another, contrary to the prior art. Also, by choosing an ellipse with a small spacing between focal points, a necessary constructural width of the spotlight of this invention is smaller than those of the prior art.

Because the first reflector has a second approximately elliptical portion in a vertical cross section through the optical axis above the optical axis with focal points having a large spacing, the light source and thereby a recess space is enclosed to a greater extent than in the prior art so that also, because of this, a light yield of the inventive spotlight is larger than in the prior art. Also, because of the second approximately elliptical portion the necessary structural height of the inventive spotlight can be reduced.

The spotlight of this invention also includes the benefit that its structural volume is smaller and its light yield larger. Further, it is uncomplicated and inexpensive to produce because, for example, no optically-corrective light shield and lens, as in a projector spotlight for example, is necessary. A substantial directional influence on light from the light source is possible because of the extensive surrounding of the light source by the reflector. Only a relatively smaller portion of light from the light source will travel through the light shield without reflecting from the reflector.

It is particularly beneficial for the spotlight to be a working spotlight with two reflectors in a common housing with a common light shield. Construction of such a working spotlight having a common housing and light shield is relatively uncomplicated. By using two reflectors, it is possible to achieve an illumination of separate and various areas depending on the respective work to be performed. That is, one of the reflectors can, as described above, be arranged to illuminate a near area, for example in front of a motor vehicle when the motor vehicle is standing still, to make possible working in this near area with the most uniform possible illumination. However, should the motor vehicle be driven, in the case of field work, it is beneficial if in addition to this near area, a distant area through an appropriately configured second reflector can be illuminated.

By making the optical axes approximately parallel, a common maximum light density in an illuminated area can be accomplished.

The second reflector can be formed such that its radiated light bundle in a horizontal axis and in a vertical axis is only diffused a small amount but with a diffusion in the horizontal direction larger than in the vertical direction. This illumination of the second reflector corresponds to a typical, distant, or high beam, spotlight reflector. However, because the first reflector can also be switched in, a good illumination of a near area as well as the far area is also possible.

With such a working spotlight it is beneficial for the second reflector to have an elliptical portion in a horizontal cross section through the optical axis with a large spacing between focal points and for the second reflector to have an approximate parabolic portion in a vertical cross section through the optical axis. By having a third approximately elliptical portion a necessary structural width of the second reflector can be decreased. By choosing a large spacing between focal points of the third approximate elliptical portion a desired small width of an illuminated surface in the horizontal axis can be guaranteed. The second approximate parabolic portion guarantees a small breadth of an illuminated area in a vertical axis. The described structure of the second reflector combined with the above described structure of the first reflector makes it possible to produce a working spotlight which makes it possible to have a small structural volume with a correspondingly large light output. The resulting reflectors often have a larger height than width so that when the reflectors are arranged side by side a substantially square housing of the working spotlight results.

In order to make possible the most uniform illumination of near areas in front of a spotlight of this invention, particularly when it is used on motor vehicles, it is beneficial for a focal length of a reflector above the optical axis to be shorter than below the optical axis. By this means a practically logarithmic increase of light density to a maximum is achieved. By properly choosing the focal length an illumination of areas above a stated maximum can be avoided so that areas outside of work areas remain dark.

One can construct the reflector of the inventive spotlight as a facet reflector in which light is reflected from each facet in a different direction, there being a great deal of overlapping of reflected filament images. Such a facet reflector is relatively uncomplicated to construct. By means of a correspondingly large overlapping of reflected filament images a uniform illumination by a spotlight of this invention is achieved.

Such uniform illumination can also be beneficially achieved if the reflector is shaped to be without steps, and contours. Such a step-less shape of the reflector is possible, for example, by forming the reflector surface as a free surface outside of horizontal and vertical planes through the optical axis. Such a step-less reflector offers a further benefit of uniform light area borders without considerable disintegration. One can unite the two reflectors to be one composite double reflector whereby the optical axis of the second reflector is approximately parallel to the optical axis of the first reflector. By this means, an uncomplicated and cost-effective embodiment of the working spotlight is made possible.

Finally, it is beneficial for the first reflector and the second reflector to be rotatable, or pivotable, independently of one another in the housing of the working spotlight. By this means, the light fields produced by both reflectors can be adjusted independently from one another to depend upon work to be performed in an illuminated area. This result makes possible the use of a light shield of the working spotlight which is not optically correcting so that there is no resulting influence of light beams reflected from the reflectors through the light shield.

Although several embodiments of this invention have been described herein, it should be understood that the invention could be made in many different ways within its scope.

The embodiments of the invention in which an exclusive property or privilege are claimed or defined are as follows:

1. Working spotlight, particularly for motor vehicles, comprising first and second reflectors, each having a light source at a focal point thereof, arranged in a common housing covered by a common, substantially-non-correcting, lens, wherein the first reflector has a first approximately elliptical portion in horizontal cross section through an optical axis thereof and a second approximately elliptical portion in vertical cross section through the optical axis above the optical axis, with a spacing between focal points of the second approximately elliptical portion being greater than spacing between focal points of the first approximately elliptical portion, and wherein the first reflector has an approximately parabolic portion located below its optical axis in vertical cross section through its optical axis, the second reflector has an approximately elliptical portion in horizontal cross section through its optical axis, and the second reflector has an approximately parabolic portion in vertical cross section through its optical axis, with spacing between focal points of the approximately elliptical portion of the second reflector being greater than spacing between focal points of the first approximate elliptical portion of the first reflector, and with the optical axes of the first and second reflectors being directed approximately parallel.

2. Working spotlight according to claim 1 wherein the light source of one of the reflectors is a transverse linear filament extending horizontal and perpendicular to the spotlight's optical axis.

3. Working spotlight according to claim 1 wherein the focal length of the first reflector is shorter above its optical axis than below it.

4. Working spotlight according to claim 1 wherein one of the reflectors is constructed of facet surfaces and wherein light from every facet is reflected in a different direction with much overlapping of reflected filament images.

5. Working spotlight according to claim 1 wherein one of the first or second reflectors is formed without steps and contours.

6. Working spotlight according to claim 1 wherein the light sources are switchable independently of one another.

7. Working spotlight according to claim 1 wherein the first and second reflectors are mounted together to form an integrated composite double reflector.

8. Working spotlight according to claim 1 wherein the first and second reflectors are arranged in a housing to be pivotable independently of one another.

* * * * *